Patented Jan. 9, 1923.

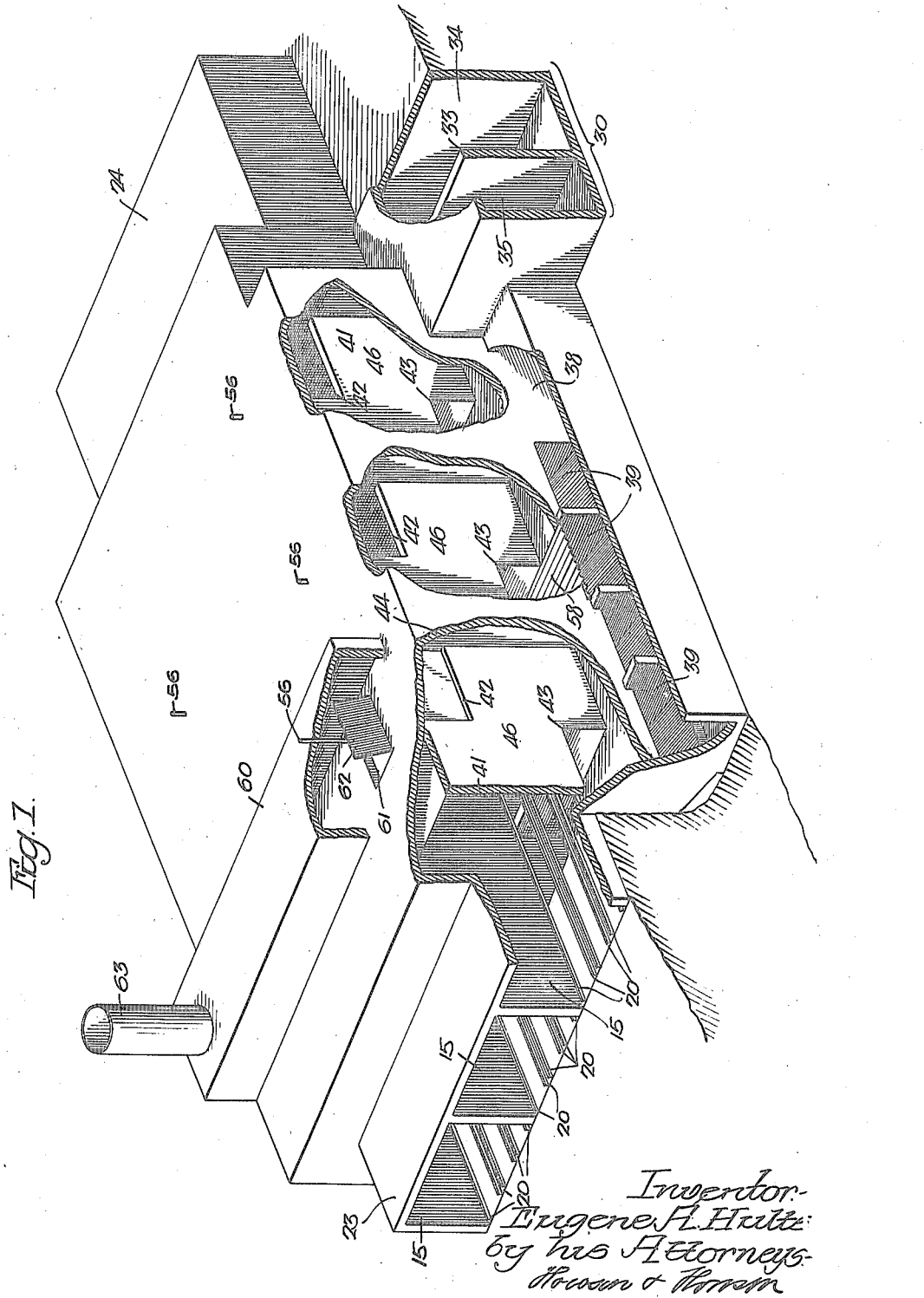

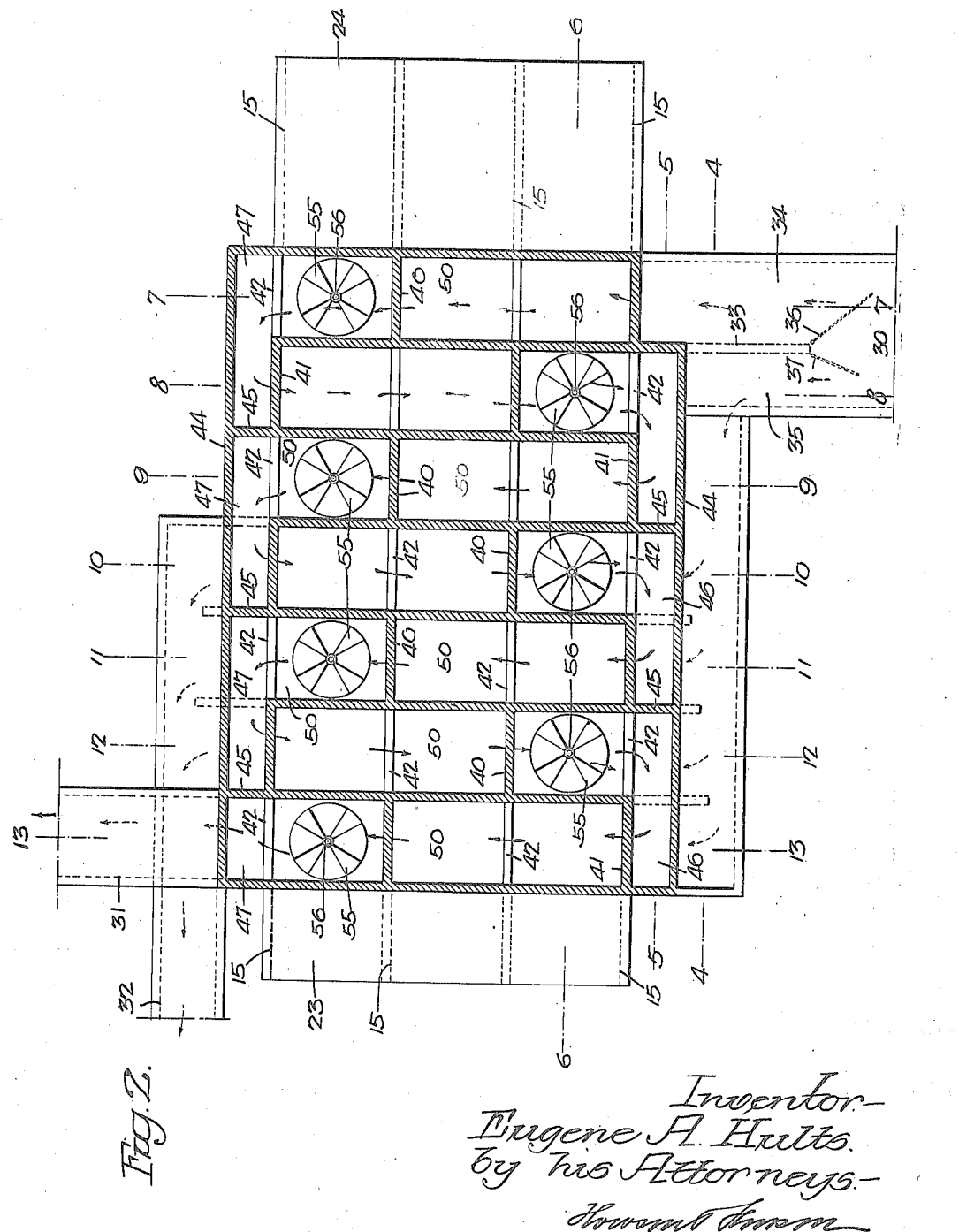

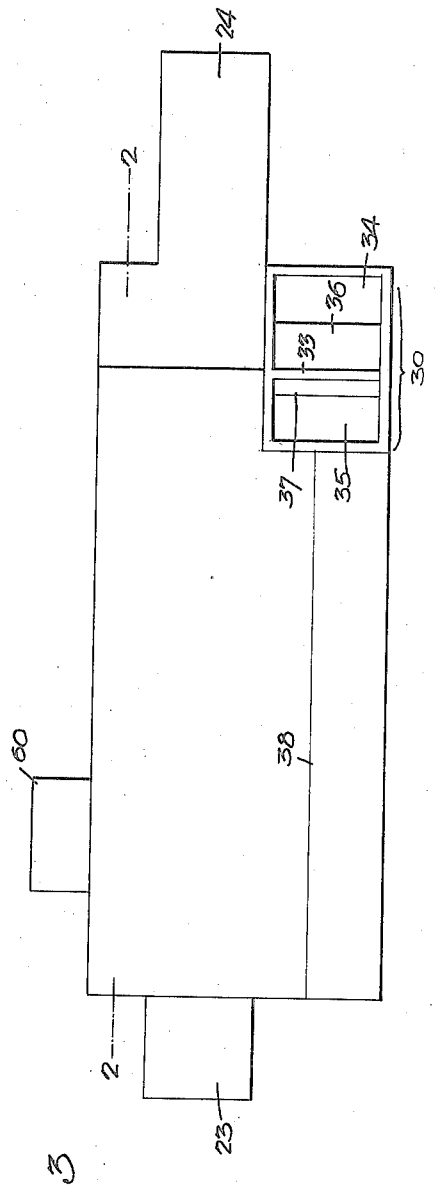
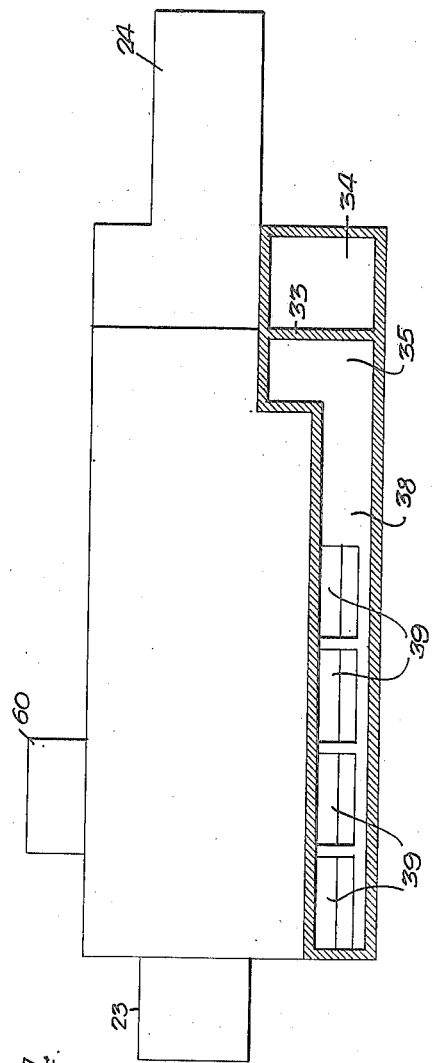

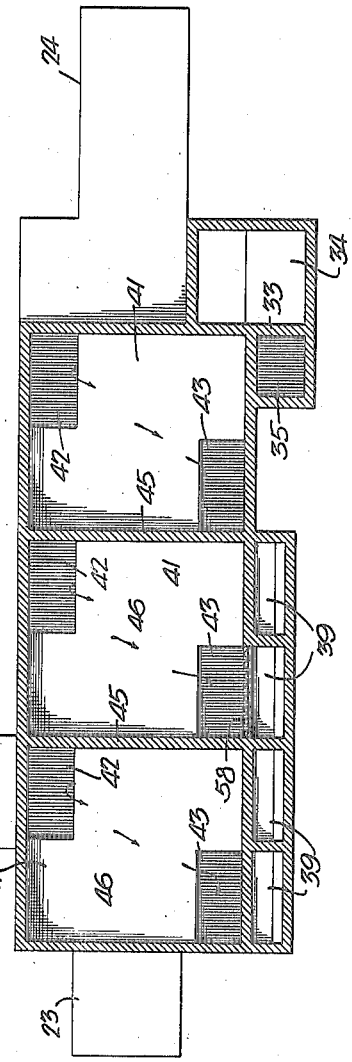
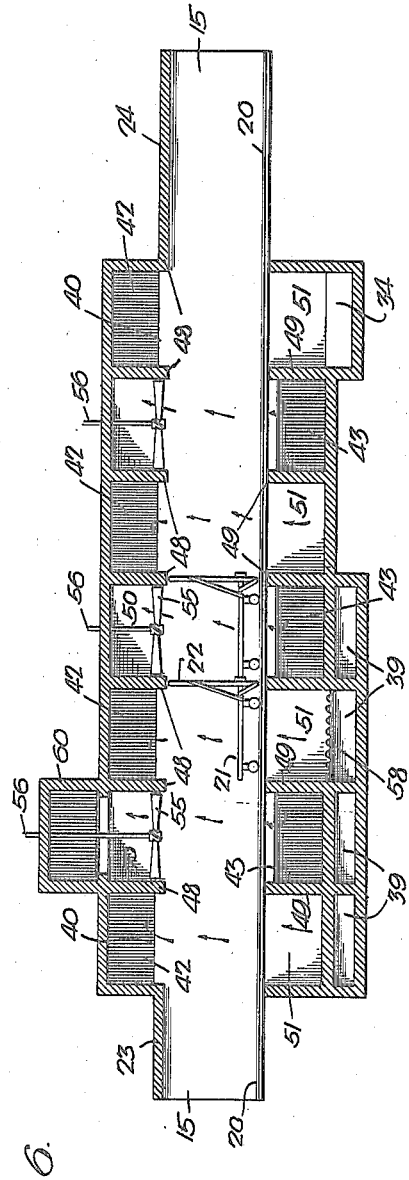
Fig. 5.
Fig. 6.
Inventor —
Eugene A. Hults.
by his Attorneys —

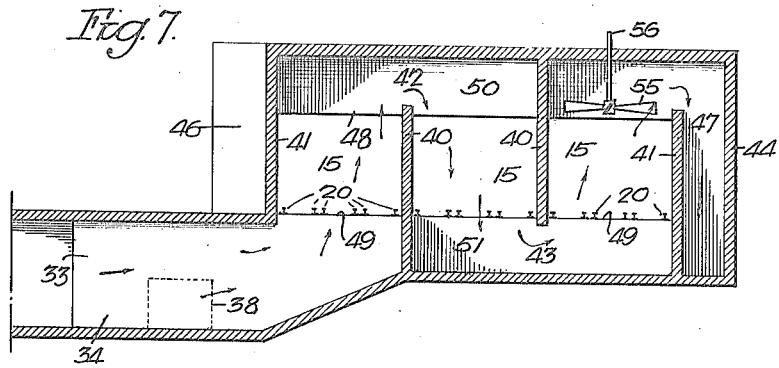
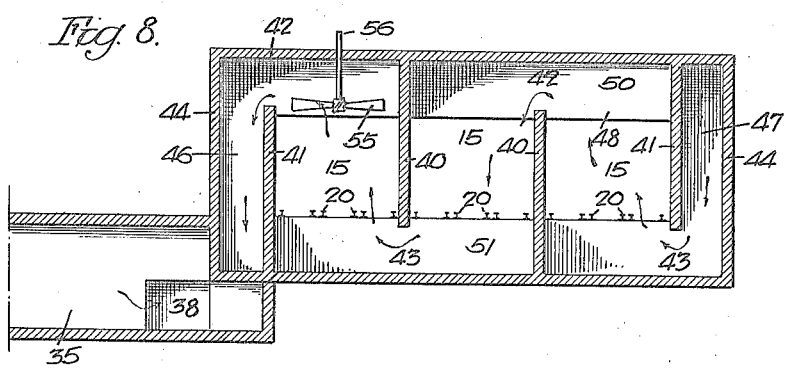
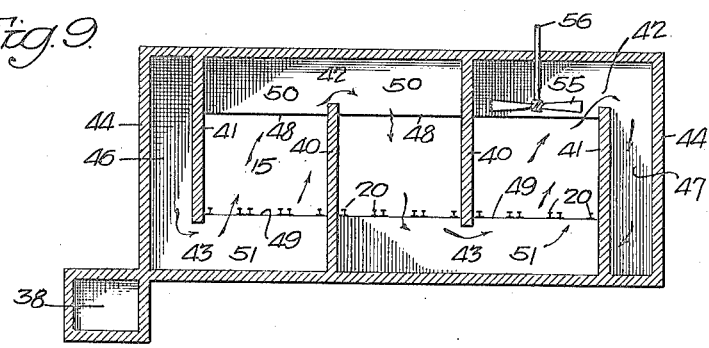

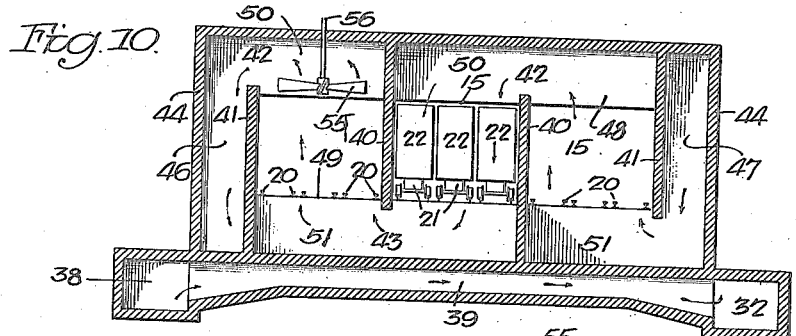
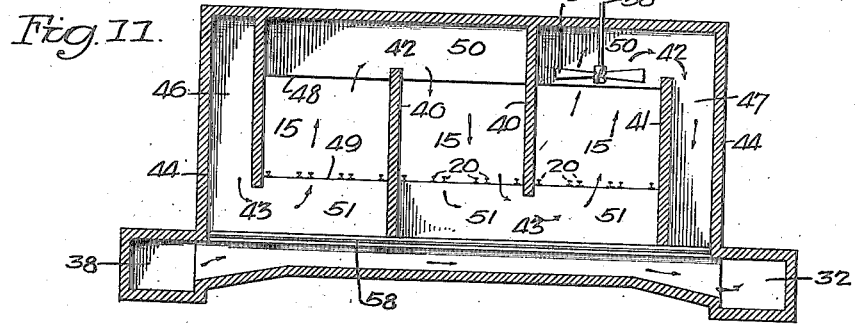
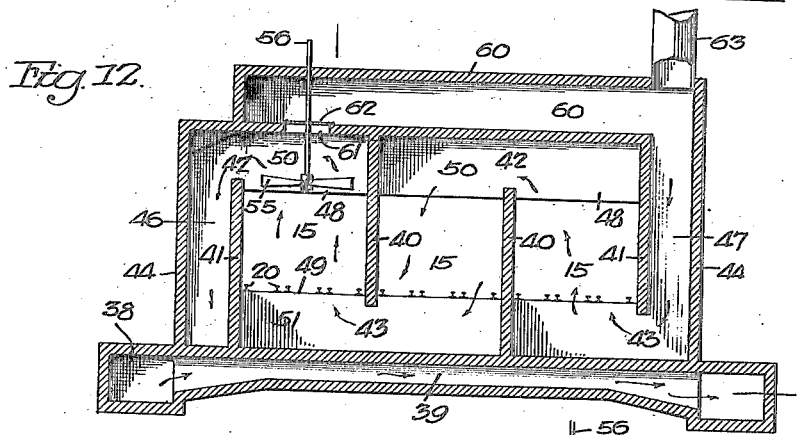
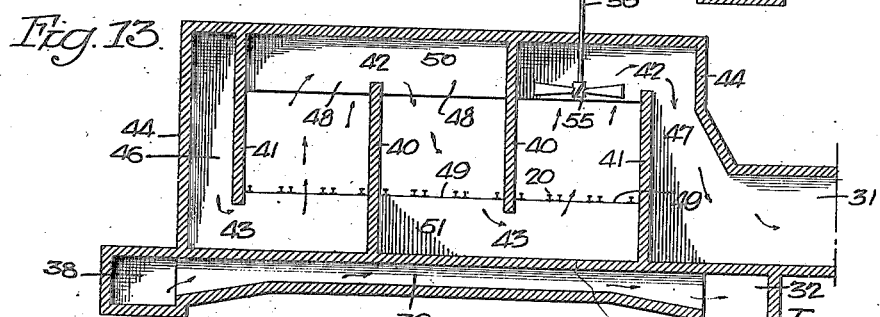

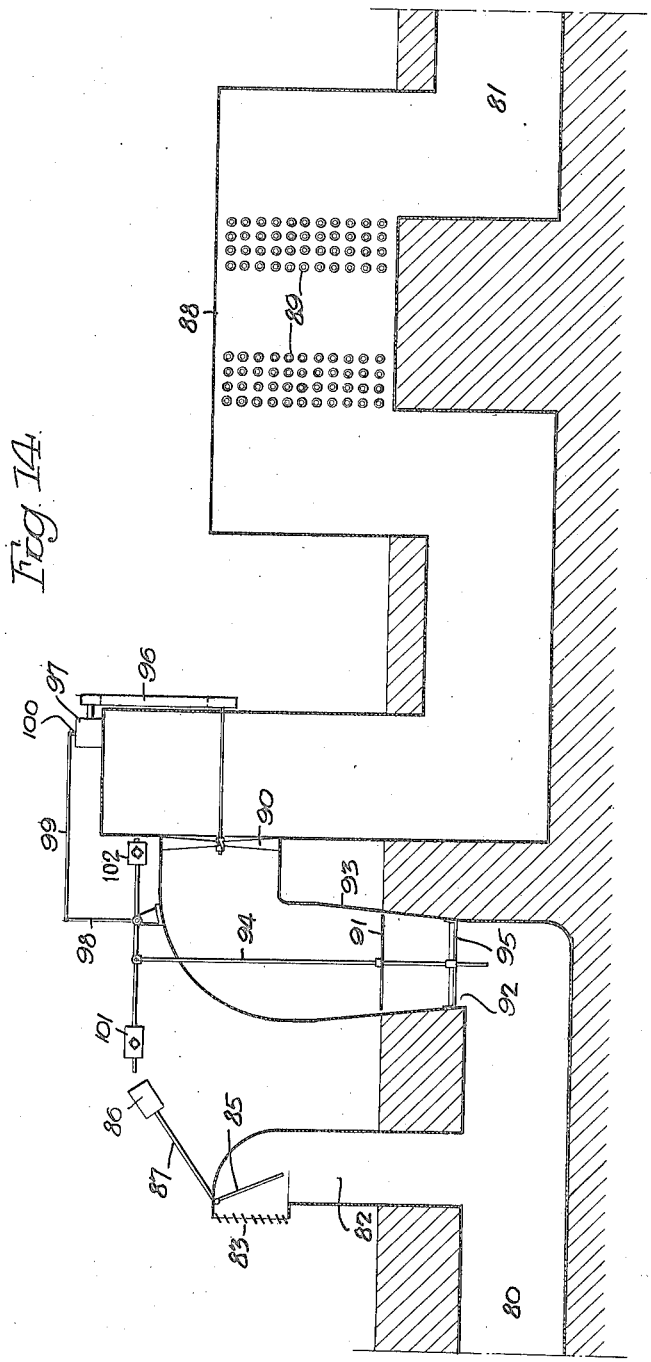

1,441,983

UNITED STATES PATENT OFFICE.

EUGENE A. HULTS, OF SALTVILLE, VIRGINIA, ASSIGNOR TO PROCTOR & SCHWARTZ, INC., OF PHILADELPHIA, PENNSYLVANIA, A CORPORATION OF PENNSYLVANIA.

WASTE-HEAT DRIER.

Application filed July 9, 1921. Serial No. 483,503.

*To all whom it may concern:*

Be it known that I, EUGENE A. HULTS, a citizen of the United States, residing in Saltville, Smyth County, Virginia, have invented certain Improvements in Waste-Heat Driers, of which the following is a specification.

My invention relates to drying systems and driers, and especially to the drying of clay products or manufactures prior to burning. The invention is of especial advantage for drying brick before they are placed in the kiln,—by means of air that has been used to cool bricks fired on a previous run of the kiln,—and I have hereinafter described the invention with special reference to this particular application.

In utilizing waste heat from brick kilns or other sources, I aim to condition the hot medium or air, when required, on its way to the drier, by means of conditioning apparatus of my invention. When my preferred type of conditioning apparatus is used with my preferred type of drier, there is afforded a complete novel drying system, including provision for moderating the temperature of the medium received from the kiln when excessive, or for raising it when too low; for controlling and regulating the flow of medium to the drier; and for supplementing the heat of the medium after its passage part way through the drier with heat from another portion of the medium.

In the conditioning apparatus, the medium may be heated by means of an auxiliary heater of any suitable type,—such as a straight baffle and checker-work furnace in which the products of combustion mingle with the medium,—a muffle furnace in which the medium and the products of combustion do not come in contact, or suitable steam coils.

For the purposes of my invention, I prefer to make the drier of a "tunnel" type,— in which the brick are piled on small cars or carriers and fed intermittently through enclosed drying chambers or "tunnels" of suitable length,—and to cause the drying medium to flow across each chamber in the same direction throughout its length. In the embodiment of my invention here shown and described, the air traverses the drier from end to end in a series of back and forth serpentine passes transversely of rows of drying chambers, and of each chamber; i. e., at each transverse pass across the drier, the air ascends in one drying chamber, descends in the second, and ascends again in the third, etc.; and at each side of the drier, the air moves longitudinally thereof to reach the next transverse pass and also descends (or ascends, as the case may be), in order that in such next pass it may traverse each of the chambers in the same direction as before, instead of in the reverse direction. Such a movement of the air always in the same direction across each chamber makes it unnecessary to provide partitions for separating various sections of a chamber from one another,—although such partitions may still be provided when preferred.

I also find it advantageous to provide for supplementing the original heat of the drying medium after it has partially traversed the drier; this may be done by reheating it, by means of a portion of the initial supply of hot drying medium diverted and directed for the purpose. Also, drying medium may be returned from one pass across a drying chamber back to such a pass already traversed by it, so as to produce a local circulation in a portion or section of the apparatus. This local circulation is made even more beneficial by suitable reheating of the drying medium so recirculated, as in the manner already described.

In the drawings,

Fig. 1 is a semi-diagrammatic perspective view of a drier constructed in accordance with my invention, certain parts being broken away to reveal its internal construction;

Fig. 2 is a plan view with the upper portion of the drier structure broken away and removed, as indicated by the section line 2—2 in Fig. 3;

Fig. 3 is a side elevation of the drier from the front of Fig. 1;

Fig. 4 is a similar view, showing a longitudinal section through the drier structure as indicated by the line 4—4, in Fig. 2;

Figs. 5 and 6 show longitudinal sections through the drier as indicated by the lines, 5, 5 and 6, 6, respectively, in Fig. 2;

Figs. 7, 8, 9, 10, 11, 12, and 13 show transverse sections through the drier as indicated by the correspondingly-numbered lines in Fig. 2;

Fig. 14 is a somewhat diagrammatic sectional view, in elevation of apparatus for conditioning the drying medium on its way to the drier.

Referring first to Figs. 1, 2, 3, and 4, it will be seen that the drier which I have illustrated has a row of three tunnels or drying chambers 15 extending side by side from end to end thereof. Tracks 20 for carriers (such as the trucks 21 with their upright transverse solid ends 22 shown in Fig. 6) extend through these drying chambers, three abreast in each chamber. The ends of the tunnels 15 are extended in both directions beyond the drier proper, with suitably reduced height, to form entrance air-locks 23 and exit air-locks 24, so that the carriers 21 may enter and leave the tunnels without material loss of hot air or influx of cold air.

Still referring to Figs. 1, 2, 3, and 4, it will be seen that the hot air is supplied to the drier through the duct 30, and that after its passage through the drier, the air is discharged through the ducts 31 and 32. It will further be seen that the supply duct 30 is divided, by a partition 33, into separate ducts or passages 34 and 35, and that swinging valves or dampers 36 and 37 are provided for controlling the admission of hot air to the respective ducts 34 and 35 and apportioning it between them as desired. The air entering the duct 34 is led into the interior of the drier proper, passed lengthwise of the same to dry the brick or other material on the carriers 21 in the tunnels 15, and discharged through the duct 31. The air entering the duct 35 passes into a longitudinal duct 38 and is thence led transversely beneath the drier proper, through a series of reheating chambers or passages 39 (Figs. 1 and 4) that deliver into the discharge duct 32. The first portion of the air, therefore, serves as the drying medium, while the second portion serves as a heating medium to supplement the heat of the first portion after it has partially traversed the drier.

Referring now to Figs. 1, 2, 5, 6, and 7 to 13, it will be seen that the drying chambers or tunnels 15 are separated from one another by longitudinal partitions 40, and that the two side tunnels are bounded on their outer sides by similar partitions 41. In the main portion of the drier,—between the air-locks 23 and 24,—the drying chambers 15 are of greater height than the carriers 21, and extend a substantial distance both above and beneath them as they rest on the rails 20. Each of the partitions 40, however, stops short of the tops and of the bottoms of the chambers 15 alternately, so as to afford openings 42 and 43 for the passage of the air from one chamber to another. These openings 42 and 43 correspond in length substantially to a multiple of the length of the carriers 21, as shown, a unit multiple. The partitions 41 stop short of the top and bottom of the drier alternately in like manner, so as to afford a series of similar openings 42 and 43 from the outer drying chambers 15 into the spaces between the partitions 41 and the outer side walls 44 of the drier. Transverse vertical partitions 45, extending from top to bottom of the main portion of the drier proper, divide the side spaces between the partitions 41 and the side walls 44 into chambers 46 and 47 at the opposite sides of the drier. Each of the side chambers 46 corresponds in length to two of the carriers 21, and thus overlaps adjacent openings 42 and 43 at top and bottom of the drier. The like also applies to the chambers 47,—except that the last chamber 47 is only half as long as the rest. It will be observed, however, that the partitions 45 at opposite sides of the drier are not directly in line with one another, but staggered so that each of the chambers 46 overlaps two of the chambers 47 for half its length,—and vice versa.

Referring now, to Figs. 2, 6, and 7 to 13, it will be seen that in line with each of the side-space partitions 45 there are other transverse partitions extending across the heating chambers 15 at each side of the openings 42 and 43 in the partitions 40 and 41. These latter transverse partitions do not, however, completely occlude the drying chambers, but are discontinued at the center to afford openings (of the same dimensions as the entrance and exit locks 23 and 24) for the passage of the carriers 21. These transverse partitions in the drying chambers 15 have, therefore, the forms of short curtains 48 depending from the top of the drier and of relatively low walls 49 extending upward from the bottom of the drier proper to the height of the rails 20,—which, as shown, the walls 49 help to support. These curtains and walls 48 and 49 divide the spaces at top and bottom of the drier (above and below the carriers 21) into a series of transverse recesses 50 and 51, and pro tanto divide each of the drying chambers 15 into a series of transverse compartments. It will further be seen, therefore, that when the carriers 21 are provided with the solid ends 22 as shown, and when the series of carriers are so placed that said ends 22 are in alignment with the partitions 46 and 47, then the openings at the transverse partitions 48, 49 are substantially closed, and the division of the drying chambers 15 into compartments is complete.

Still referring to Figs. 2, 5, 6, and 7 to 13, it will be seen that in reference to each of the compartments just mentioned, the openings 42 and 43 in the partitions 41, 40, 40, and 41 are at bottom and top (or top and bottom) of the drier alternately. As a result, the drying medium entering through the duct 34 is directed lengthwise of the drier in a series of back and forth serpentine passes transversely of the row of drying chambers and of each chamber,—i. e., in each transverse pass the drying medium ascends transversely in one of the drying chambers, descends in the next, and ascends in the other. Since, however, the drying medium descends in a side chamber 46 or 47 after each transverse pass, it will be seen that it ascends at every region or section of the two outer drying chambers throughout their length, and descends at every region or section of the middle drying chamber. By observing the arrows in Figs. 2, 7, 6, 8, 5 and 9 to 13,—referring from time to time to Figs. 5 and 6,— the course of the drying medium can readily be traced from the intake 34 to the discharge 31.

Referring especially to Figs 1, 2, 6, and 7 to 13, it will be observed that at the further end of each of the transverse passes of the heating medium across the row of drying chambers, there is arranged a fan 55 rotating about a vertical shaft 56 extending down through the top of the drier. These fans serve to aid the passage of the heating medium through the drier.

Referring, now, to Figs. 1, 2, 4, 5, 6, and 10 to 13, it will readily be seen how the air entering the duct 35 serves as a heating medium to reheat the drying medium during the passage of the latter through the recesses 51 at the bottom of the last four transverse compartments of the heating chambers 15. By this means, the original heat of the drying medium will be supplemented after it has partially traversed the drier, and its power of absorbing moisture will thus be augmented in correspondence with the greater amount of moisture present in the relatively green brick entering through the locks 23 at this end of the drier. To promote a more thorough interchange of heat, the septum between one of the heating chambers 39 and the overlying recesses in the drying chamber may be made of relatively thin corrugated sheet iron, as shown at 58 in Figs. 6 and 11.

In Fig. 2, it will be observed that the partitions separating the several reheating passages 39 from one another extend into the intake or supply duct 38 greater and greater distances as the right hand end of the drier in that figure is approached,—and similarly into the outlet or discharge duct 32,—so as to promote a uniform passage of the heating medium through these parallel reheating chambers.

Referring to Figs. 1, 6, and 12, it will be observed that across the top of the drier there extends a transverse trunk or duct 60 which, as shown, substantially coincides in width and location with a transverse pass or compartment of the drying chambers 15. One end of this passage 60 opens freely into the side chamber 47 at the beginning of this transverse pass; the other end has an opening 61 into the recess 50 at the upper end of the last ascending pass of this transverse pass of the drier. This latter opening is provided with a swinging regulating and stop valve or damper 62. By means of the duct 60 and its damper 62, the drying medium can be returned from the final ascending pass in the last drying chamber 15 (Fig. 12) back across the drier to the right hand side chamber 47 and to the initial ascending pass in the right-hand drying chamber 15,— and thus a regulable local circulation of the heating medium may be produced in a portion of the apparatus. The beneficial effect of this local circulation will, of course, be augmented by the reheating of the medium in the lower recesses 51 at this section of the drier.

If found desirable, the duct 60 and the damper 62 can be used as a means of withdrawing a regulated portion of the drying medium at this point of its passage through the drier; and the portion thus withdrawn may be discharged through the stack 63. Also, the drying medium may be supplemented,—or the portion withdrawn as just described replaced,—to any extent desired by merely drawing aside or removing a portion of one of the septa between the heating ducts 39 and the drying chamber,—especially the sheet iron septum 58.

In traversing the drying chambers 15, the drying medium will come in contact with all portions and surfaces of the brick or other products on the carriers 21, and so take up their moisture to the best advantage. If desired, means additional to the reheaters 39 and the return by-pass 60 may be provided for regulating the volume, velocity, temperature, and humidity in various parts of the drier,—as by thermostatic control of the dampers 36, 37, and 61, etc. The contact of the air with the ware serves, of course, as a means of altering and (in conjunction with the by-pass 60) of controlling and regulating its humidity.

Referring, now, to the conditioning apparatus shown in Fig. 14, it will be seen that the hot air from the kiln (not shown) is received by a subterranean conduit 80, 81 which conveys it to and from the various parts of the conditioning system and leads it away to the intake 30 of the kiln (not here shown).

The temperature of the air entering the intake conduit 80 is moderated, when excessive, by cold air admitted to said conduit 80 by means of an upstanding intake 82 with a lateral mouth at its upper end. The admission of air may be regulated either manually, by means of a shutter damper 83 in the intake mouth; or automatically, as by means of a swinging damper 85 pivoted at the upper side of the intake passage and equipped with a counterweight 86 adjustable along a crank arm or lever 87 to admit the air in such amount or volume as may be required from time to time; or in both ways. When too low, the temperature of the air passing through the conduit 80, 81 is raised by a heater 88 comprising banks of steam coils 89 to which steam may be admitted up to any extent of heating surface required.

The volume of air passing through the conduit 80, 81 and over the heating coils 89 to the drier may be regulated manually or automatically or both, by means of a constant volume governing mechanism comprising a rotary suction fan 90 for moving the air and a member 91 responsive to the flow of air. As shown, the conduit 80 has a vertical section with a venturi throat 92 at its lower end and a rather prolonged, gradual upward flare 93 beyond the throat. The member 91 is in the form of a relatively thin, light metal disc mounted on a longitudinally movable, vertical rod 94 whose lower end is guided in a cross-arm 95 mounted across the flare 93 near its lower end; and the member 91 floats on the upward-flowing air in the flare 93. The fan 90 is mounted in a horizontal portion of the conduit, beyond the disc 91, on a horizontal shaft driven by a belt 96 from a variable-speed electric motor 97 (for example). The upper end of the rod 94 is pivoted to one horizontal arm of a double bell-crank lever 98 whose upstanding member is pivoted to a link 99 connected to the speed-control device 100 of the motor 97. The horizontal arms of the bell-crank lever 98 at either side of its fulcrum have counterweights 101 and 102 adjustable along the lever to regulate the action of the governor.

When the upward flow of air increases unduly, the disc 91 rises and actuates the motor-controller 100 to reduce the speed of the fan 90, when the flow diminishes unduly, the reverse action takes place. Thus the volume of air passing and the rate of flow can be maintained constant, and can be regulated and "set" as desired by adjustment of the counterweights 101 and 102 to regulate the velocity and pressure of air beneath the disc 91 required to maintain it in a certain vertical position.

It will be seen that the regulation of the temperature of the heating medium for both drying and reheating in the drier by the conditioning apparatus insures against overheating of the ware therein, either as the air first enters the drier or after it has been reheated.

I claim:

1. The combination in a drier of a plurality of longitudinal drying chambers to receive the material to be dried, the partitions separating the chambers having each a series of openings alternately at top and bottom; and means for circulating the air through said openings transversely of the drier and in one direction in each chamber.

2. A drier comprising a row of chambers and means for directing the drying medium lengthwise of the drier, in a series of back and forth serpentine passes transversely of the rows of chambers and transversely of each chamber at each traverse thereof.

3. A drier comprising a row of chambers and means for directing the drying medium lengthwise of the drier, in a series of back and forth serpentine passes transversely of the rows of chambers and transversely of each chamber at each traverse thereof, and always in the same direction across each chamber.

4. A drier comprising a row of drying chambers; means for directing the drying medium lengthwise of the drier, in a series of back and forth serpentine passes transversely of the rows of chambers and of the several chambers; means for reheating the drying medium during its transitions from chamber to chamber; and means for returning the drying medium from one pass across a chamber back to such a pass already traversed by it, so as to produce a local circulation in a portion of the apparatus.

5. The combination in a continuous drier of a series of longitudinal partitions forming a plurality of chambers, each partition stopping short of the tops and bottoms of the chambers alternately to allow the air to pass from one chamber to another; connecting passages at each side of the drier through which the air travels from one transverse section of the drier to another; and means for carrying material through the several chambers.

6. The combination in a continuous drier, of a series of longitudinal partitions dividing the drier into a plurality of chambers; a series of transverse partitions dividing the chambers into a series of transverse passes; carriers for said chambers with partitions mounted thereon for forming continuations of the transverse partitions of the drier; and means for circulating air through said transverse passes in one direction in each drying chamber.

7. The combination, in a continuous drier, of a series of longitudinal partitions forming a plurality of drying chambers and a series of transverse partitions dividing each drying chamber into compartments, the longitudinal partitions between the chambers stopping short of the top of alternate compartments and of the bottoms of the other compartments and the transverse partitions being discontinued at the center to allow for the passage of the material to be dried; carriers arranged to travel longitudinally in the drying chambers; partitions mounted on the carriers to form continuations of the transverse partitions; and passages at the sides of the drier so connected with the compartments that the air entering the drier at one end will be directed through the several compartments to the other end, flowing in one direction in all the compartments of each chamber.

8. The combination, in a continuous drier, of a series of longitudinal partitions dividing the drier into a plurality of drying chambers; a series of transverse partitions, the partitions being so formed that air entering the drier will flow transversely therethrough; means for conveying the material to be dried longitudinally through the chambers; and means for reheating the air as it flows through the drier.

9. A drier comprising a row of drying chambers; means for directing the drying medium lengthwise of the drier, in a series of back and forth serpentine passes transversely of the rows of chambers and of the several chambers; and means for reheating the drying medium during its transitions from chamber to chamber.

10. A drier comprising a row of drying chambers; means for directing the drying medium lengthwise of the drier, in a series of back and forth passes transversely of the rows of chambers and of the several chambers, including recesses overlapping and connecting adjacent passes across the chambers at opposite ends of such passes alternately; and means for passing a heating medium over the walls of such recesses to reheat the drying medium as it traverses them.

11. A drier comprising a row of drying chambers; means for directing the drying medium lengthwise of the drier, in a series of back and forth passes transversely of the rows of chambers and of the several chambers, including recesses overlapping and connecting adjacent passes across the chambers at opposite ends of such passes alternately; and means for passing a heating medium transversely of the drier beneath recesses subjacent to its drying chambers, to reheat the drying medium as it traverses such recesses.

12. A drier comprising a row of drying chambers; means for directing the drying medium lengthwise of the drier, in a series of back and forth passes transversely of the rows of chambers and of the several chambers, including recesses overlapping and connecting adjacent passes across the chambers at opposite ends of such passes alternately; and means for passing a heating medium over the walls of such recesses to reheat the drying medium as it traverses them; and means for returning the reheated drying medium from one pass across a chamber back to such a pass already traversed by it, so as to produce a local circulation of heating medium in a portion of the apparatus.

13. The combination, in a continuous drier, of a series of longitudinal partitions dividing the drier into a plurality of chambers and a series of transverse partitions dividing each chamber into a series of compartments, the transverse partitions being discontinued at the center to allow for the passage of material to be dried through the chambers, and the longitudinal partitions stopping short of the tops of alternate compartments and short of the bottom of the other compartments; chambers at each side of the drier so connecting adjacent compartments that air admitted to one end of the drier will flow through the drier; means for circulating air in the drier; and means for reheating the air after it has circulated through the first series of compartments.

14. A drier comprising a row of drying chambers; means for supplying heated drying medium; means for directing a portion of the drying medium lengthwise of the drier, in a series of back and forth passes transversely of the rows of chambers and of the several chambers; and means for diverting and directing a portion of the drying medium to supplement the heat of the first-mentioned portion after such portion has partially traversed the drier.

15. A drier comprising a row of drying chambers; means for supplying heated drying medium; means for directing a portion of the drying medium through the drying chambers; and means for diverting and directing a portion of the drying medium to reheat the first-mentioned portion after such portion has partially traversed the drier.

16. A drier comprising a row of drying chambers; means for supplying heated drying medium; means for directing a portion of the drying medium lengthwise of the drier, in a series of back and forth passes transversely of the rows of chambers and of the several chambers; and means for diverting and directing a portion of the drying medium to reheat the first-mentioned portion during its transition from chamber to chamber.

17. The combination, in a continuous drier, of a series of longitudinal partitions dividing the drier into a plurality of chambers and a series of transverse partitions dividing each chamber into a series of compartments, the transverse partitions being discontinued at the center to allow for the passage of carriers for the material to be dried, and the longitudinal partitions stopping short of the tops of alternate compartments and of the bottoms of the other compartments; heating chambers under a portion of the drier to preheat the air flowing through the drying chambers; and a hot air supply duct common to the main drying chambers and the reheating chambers, so that a portion of the hot air shall flow into and through the drying chambers and the remaining portion directly to the reheating chambers.

18. The combination, in a continuous drier, of a series of longitudinal partitions dividing the drier into a plurality of chambers; a series of transverse partitions discontinued at the center to allow the material to be dried to pass longitudinally through the drying chambers; a series of reheating chambers under a portion of the drier; a hot air duct common to both the drying chambers and the reheating chambers; means for regulating the flow of air to said drying and reheating chambers; and means for directing the air into one or more of the reheating chambers.

19. A drying system comprising, in combination, an intake conduit for heating medium from a source of waste heat; means for moderating the temperature of the hot medium passing through said conduit when excessive; means for raising the temperature of said medium when too low; a drier receiving the medium from said conduit; and constant volume governing mechanism for controlling the flow of heating medium to the drier.

20. A drying system comprising, in combination, an intake conduit for heating medium from a source of waste heat; means for moderating the temperature of the heat medium passing through said conduit when excessive, and for raising it when too low; and a drier receiving the medium from said conduit: with means for reheating the medium after its passage part way through the drier.

21. A drying system comprising, in combination, a conditioning apparatus receiving heating medium from a waste heat source, with means for moderating the temperature of the medium when excessive and for raising it when too low; a drier receiving a portion of the heating medium from said conditioning apparatus as its drying medium; and means for supplementing the heat of said portion with another portion of said heating medium after such first-mentioned portion has partially traversed the drier.

22. A conditioning apparatus for heating medium for drying purposes, comprising in combination, an intake conduit for the heating medium from a waste heat source; and means for admitting cold air to said conduit to moderate the temperature of the hot medium from said source when excessive; a heater for raising the temperature of said medium when too low; and constant volume governing mechanism for controlling the flow of heating medium through said conduit.

23. A conditioning apparatus for a heating medium from a waste heat source comprising, in combination, a conduit for receiving the medium from such source and delivering it to the drier; means for admitting cold air to said conduit to moderate the temperature of the medium therein when too low; and constant volume governing mechanism controlling the flow of medium through said conduit to the drier.

EUGENE A. HULTS.